United States Patent [19]

Nessi

[11] 4,326,829

[45] Apr. 27, 1982

[54] APPARATUS FOR LIFTING A HEAVY LOAD AND TRANSPORTING IT OVER AN OBSTRUCTION

[75] Inventor: Aurindo Nessi, Albate, Italy

[73] Assignee: Innocenti Santeustacchio S.p.A., Italy

[21] Appl. No.: 114,695

[22] Filed: Jan. 23, 1980

[30] Foreign Application Priority Data

Feb. 12, 1979 [IT] Italy ............................ 20116 A/79

[51] Int. Cl.$^3$ ............................................ B65G 67/02

[52] U.S. Cl. .................................. 414/357; 104/122; 414/338

[58] Field of Search ......................... 212/71, 124–127, 212/131, 205, 216; 414/337, 338, 357, 377, 381, 387, 560, 561, 564; 198/477, 488, 678; 104/122; 105/241.1, 241.2, 242

[56] References Cited

U.S. PATENT DOCUMENTS 2,868,354 1/1959 Harrison ............................ 198/477

2,941,648 6/1960 Johansson et al. .................. 198/488

4,082,042 4/1978 Barry .................................. 104/122

*Primary Examiner*—Robert G. Sheridan

*Attorney, Agent, or Firm*—Birch, Stewart, Kolasch & Birch

[57] ABSTRACT

The present invention is directed to an overhead travelling crane for lifting and transporting a heavy load over an obstacle including a carriage with front and rear wheels mounted on independent axles for movement along respective rails. The rails engaged by the rear wheels are horizontal while those engaged by the front wheels each have a first section sloping upwardly from a starting point at one side of the obstacle, a central horizontal section extending over the obstacle and a final downwardly-sloping section. In use, a load is engaged with a support member adjacent the front end of the carriage and the carriage is driven along the rails to transport the load, the load being raised as the front wheels climb the first sections of their rails and being lowered as the front wheels descend the final sections.

4 Claims, 3 Drawing Figures

APPARATUS FOR LIFTING A HEAVY LOAD AND TRANSPORTING IT OVER AN OBSTRUCTION

BACKGROUND OF THE INVENTION

The present invention relates to an apparatus for lifting a heavy load and transporting it over an obstruction and particularly, but not exclusively, for the rapid transport of mandrels in a continuous rolling mill for the production of tubes without welding.

During the operation of a continuous rolling mill, in which tubes are made by rolling intermediate forgings carried on respective mandrels, the mandrels are recovered from the rolling operation and are returned to the inlet to the mill along a so-called mandrel circulation route. This route traverses successive stations during which operations such as cooling and lubrication of the mandrels are carried out and, in most cases, terminates at a take-up station during which the mandrels, which are ready to be re-used, are fed at predetermined, regular time intervals. The take-up station is normally located to one side of an input roller bed of the rolling mill, the mandrels being arranged with their axes parallel to the rolling axis, and from here they are transferred to a pre-insertion table, usually at the other side of the input roller bed, where they are inserted into respective intermediate forgings.

During the transfer from the take-up station to the pre-insertion table, the mandrels are moved perpendicular to their axes and must be lifted over the roller bed and any other obstructing part of the rolling mill. The known apparatus for effecting this transfer has many disadvantages, one of which is the lengthy time needed for completion of the transfer. A further disadvantage is that most known apparatus employ cables for lifting the mandrels and these may allow pendular swinging of the mandrels during transfer.

The object of the present invention is to provide apparatus for lifting and transporting heavy objects, particularly for lifting and transporting mandrels in a continuous rolling mill, which can effect the transfer of a mandrel from the take-up station, over the input roller bed and onto the pre-insertion table more rapidly than the known apparatus and with less risk of pendular swinging of the mandrel.

SUMMARY OF THE INVENTION

The present invention therefore provides an apparatus for lifting a heavy load and transporting it over an obstruction, comprising an overhead travelling crane having:

a supporting bridge structure;

a first set of horizontal, parallel rails carried by said bridge structure and extending in the direction of transport of the load above the level of said obstruction;

a carriage having a front axle and a rear axle with respect to said direction of transport, each axle being provided with wheels and the wheels of one of said front or rear axles being engaged each with a respective rail of said first set of rails to support the carriage thereon; and drive means for driving said carriage along said rails, wherein said bridge structure carries a second set of rails, each rail of which is disposed in a plane parallel to said direction of transport and has a central, horizontal section extending above the level of said obstruction and end sections which slope downwardly from said central section, and the wheels of the other of said front or rear axles are engaged each with a respective rail of said second set of rails, the carriage having load support means at its end adjacent said other of said front and rear axles.

BRIEF DESCRIPTION OF THE DRAWINGS

One embodiment of the invention will now be described, by way of example, with reference to the accompanying drawings, in which.

DESCRIPTION OF THE PREFERRED EMBODIMENT

Figure 1:
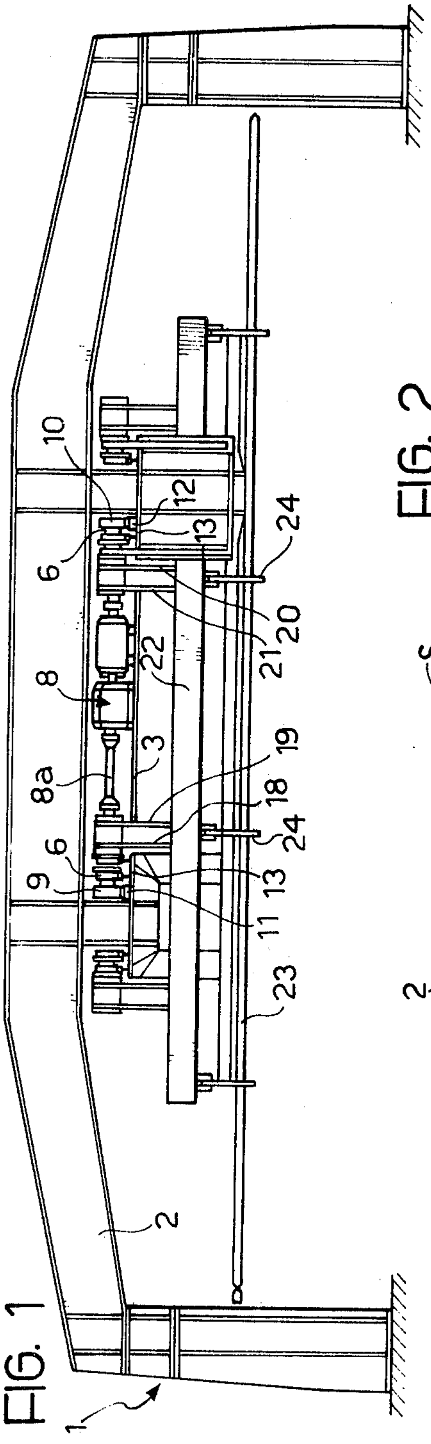
FIG. 1 is an elevational view of a lifting and transport apparatus according to the invention.
Figure 2:
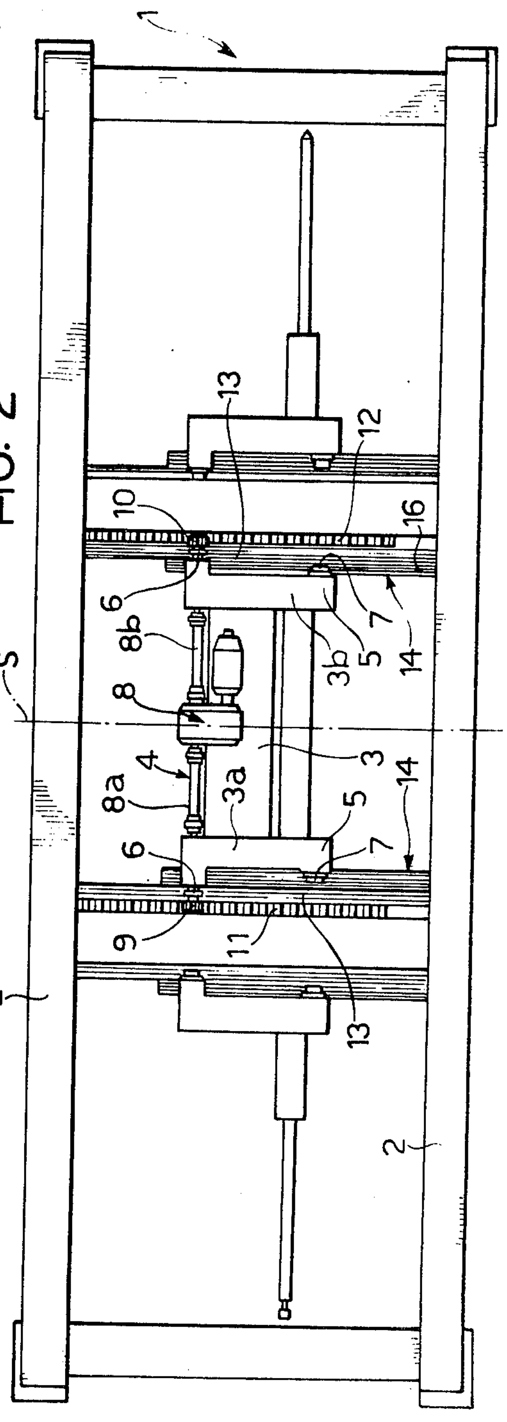
FIG. 2 is a top plan view of the apparatus of FIG. 1.

Referring to FIGS. 1 and 2 of the drawings, an overhead travelling crane is shown having a supporting bridge structure including uprights 1 and two spaced apart transverse girders 2 extending parallel to each other between the uprights 1. The girders 2 extend above and parallel to an input roller bed (not shown) of a continuous rolling mill (not shown) for the production of tubes by rolling intermediate forgings carried on respective mandrels, one of which is shown at 23. The two girders 2 support rails 13, 14 which extend perpendicular to the input roller bed and to the girders 2 and which support and guide a carriage 3 for transporting mandrels 23 from one side of the roller bed to the other.

The carriage 3 has a front axle 5 and a rear axle 4, each provided with respective wheels 7, 6 adjacent each end, the wheels 7 of the front axle being engaged with respective support rails 14 while the wheels 6 of the rear axle are engaged with respective rails 13. The carriage 3 also has a motor 8, for driving it along the rails 13, 14, mounted substantially centrally of its rear axle 4. Drive shafts **8*a*, 8*b* of the motor 8 are coaxial with the axle 4 and carry pinion wheels 9, 10 at their respective free ends, these pinion wheels 9, 10 being engaged with respective racks 11, 12 which extend horizontally parallel to and adjacent a respective rail 13**.

Figure 3:
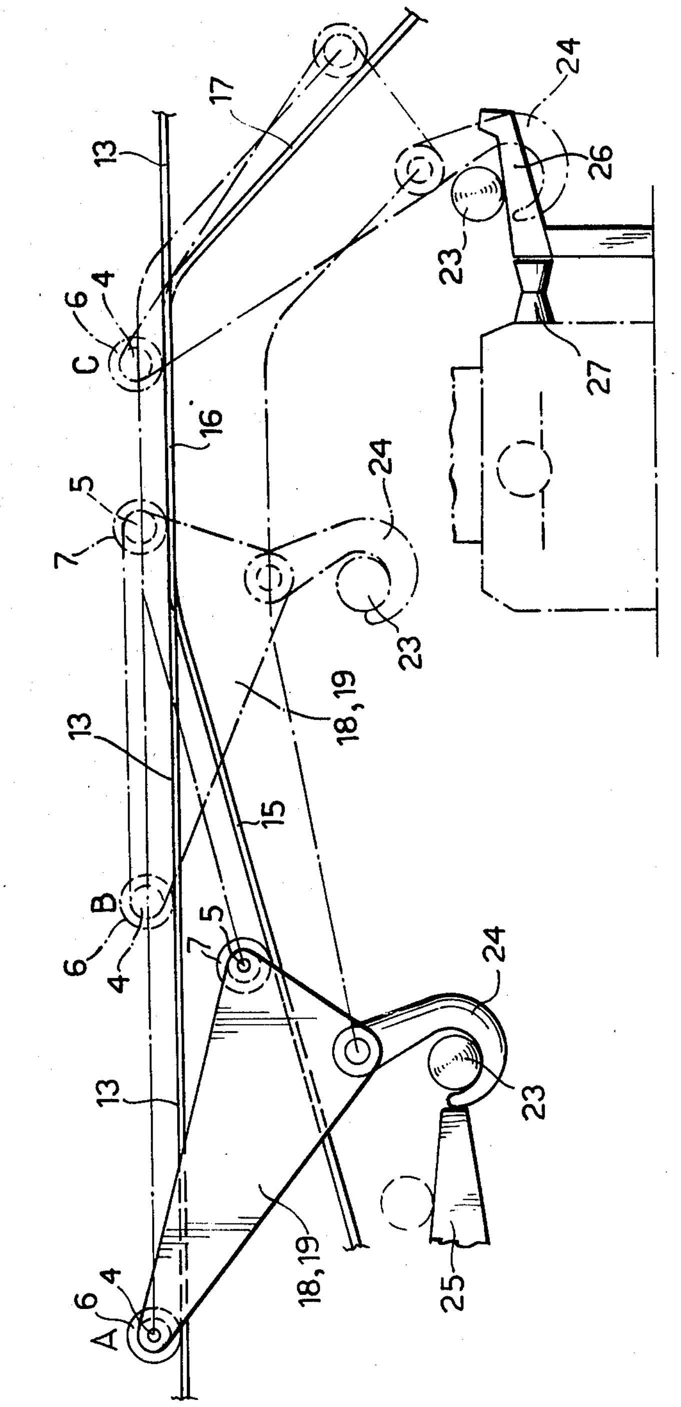
FIG. 3 is a side elevational view, on an enlarged scale, of a carriage forming part of the apparatus of FIG. 1, taken in a direction perpendicular to that of FIG. 1.

Although the rails 13 are straight and horizontal, as will be seen from FIG. 3 each rail 14 is formed in three sections which are inclined to each other; more particularly, each rail 13 has a central section 16 which is horizontal and located at the same height as the rails 13 and end sections 15, 17 each of which slopes downwardly from the central section 16. The length and inclination of the sections 15, 17 and the length and height of the central section 16 are fixed but may, of course, be varied according to the size of the obstacle to be surmounted. In general, however, the inclination to the horizontal of the starting section, in this case section 15, of the rail along which the carriage 3 travels in lifting a load, is relatively small, whereas the descending section 17 may be steeper.

In order to provide for lifting of a mandrel 23, the carriage 3 has two pairs of connecting plates 18, 19 and 20, 21 which lie in vertical planes parallel to the rails 13, 14, the pairs being located at opposite sides of the carriage 3, and being connected to the axles 4, 5 by known means which allow pivoting of the plates relative to the axles. Each plate 18, 19, 20, 21 is substantially triangular in shape, the axles 4, 5 being located at the corners adjacent the longest side of the triangle, which is uppermost, and a bar 22 extending between the plates and being supported at their lowermost corners which are close to the axle 5 at the front of the carriage 3. The bar 22 serves to support four hooks 24 which are pivotable on the bar 22, and spaced along it and on which a mandrel 23 can be supported for transportation, as shown. Other suitable load supports may, of course, be provided instead of the hooks 24.

OPERATION

The carriage starts at the left hand position of FIG. 3, indicated as A, which is located at one side of the input roller bed of the rolling mill and where a mandrel 23 is loaded onto the hooks 24, for example, by means of a chute 25. The motor 8 is then started and, due to the engagement of the pinion wheels 9, 10 with the respective racks 11, 12, drives the carriage along the rails 13, 14.

During the first stage of this movement, the rear wheels 6 run along their respective rails 13 while the front wheels 7 run up the ascending sections 15 of the rails 14 to raise the mandrel 23 above the level of the roller bed and any other part of the rolling mill structure beneath the bridge structure 1, 2. The carriage then reaches the intermediate stage indicated as B in which the wheels 7 run along the central, horizontal section 16 of the rails 14, over and beyond the roller bed, until, finally, the carriage reaches the stage indicated as C in which the wheels 7 pass onto the descending sections 17 of the rails 14.

In stage C the wheels 6 continue to run along the horizontal rails 13 but the wheels 7 descend the sections 17 to lower the mandrel 23 at the opposite side of the roller bed from the starting position. The mandrel 23 may, for example, be lowered onto a further chute, indicated as 26, which directs it onto a roller bed 27 of a pre-insertion table from which it is inserted into an intermediate forging (not shown) to be rolled in the rolling mill.

The apparatus according to the invention described above thus allows the lifting and transporting of a mandrel across a roller bed to be achieved quickly and easily; in fact, the lifting and lowering of the mandrel take place simultaneously with its transport, avoiding the delays which occur in the use of known apparatus due to stoppages between the various stages of movement. The continuous movement of the mandrel also reduces the danger of pendular swinging of the mandrel during transfer compared with known apparatus.

A further advantage of the present invention is that there is no need to mount raising and lowering tackle for the mandrel on the carriage as in known apparatus.

What is claimed is:

1. An apparatus for lifting a heavy load and transporting it over an obstruction, comprising an overhead travelling crane having;

a supporting bridge structure;

a first set of horizontal, parallel rails carried by said bridge structure and extending in the direction of transport of the load above the level of said obstruction;

a carriage having a front axle and a rear axle with respect to said direction of transport, each axle being provided with wheels and the wheels of one of said front or rear axles being engaged each with a respective rail of said first set of rails to support the carriage thereon; and drive means for driving said carriage along said rails, wherein said bridge structure carries a second set of rails, each rail of which is disposed in a plane parallel to said direction of transport and includes a central, horizontal section extending above the level of said obstruction and end sections which slope downwardly from said central section, and the wheels of the other of said front or rear axles being engaged each with a respective rail of said second set of rails to lower said carriage at an angle with respect to said first set of horizontal, parallel rails during movement of said wheels of said other of said front or rear axles over the end sections of said second set of rails, the carriage having load support means at its end adjacent said other of said front and rear axles.

2. An apparatus according to claim 1, wherein the carriage includes two substantially triangular plates, the front and rear axles being located at two respective vertices thereof and the load support means being carried at the third vertices of said plates, below the said front and rear axles.

3. An apparatus according to claim 1 or claim 2, wherein the drive means comprises a drive pinion connected to the carriage, a rack extending parallel to the respective first set of rails and engaged by said pinion and an electric motor drivingly coupled to said pinion and mounted on the carriage.

4. An apparatus according to claim 1, wherein said wheels mounted on said rear axle engage said first set of horizontal, parallel rails and said wheels mounted on said front axle engage said second set of rails.

* * * * *